W. J. PEES.
MIXER.
APPLICATION FILED MAR. 15, 1917.
1,337,468.
Patented Apr. 20, 1920.
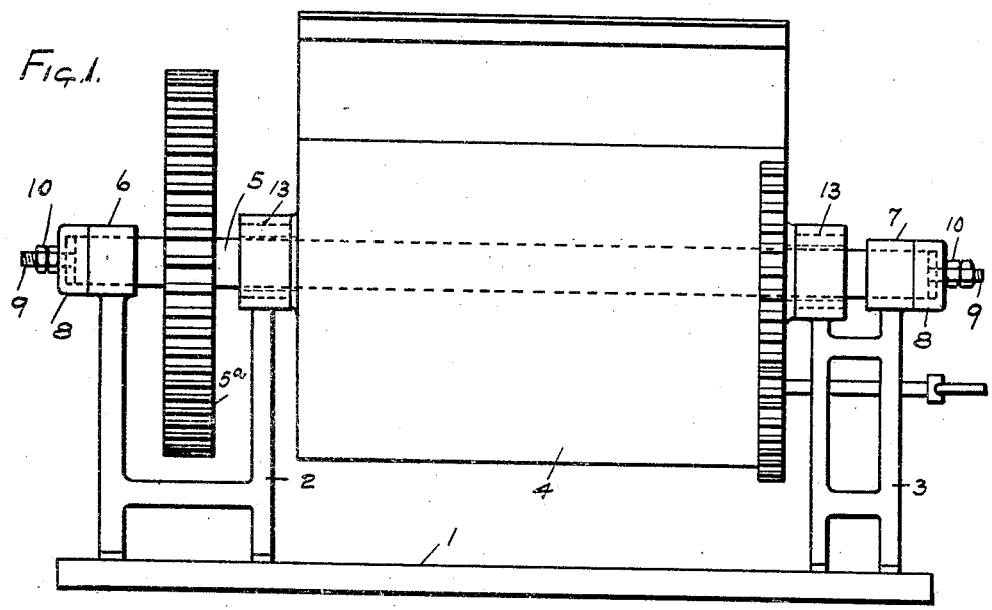
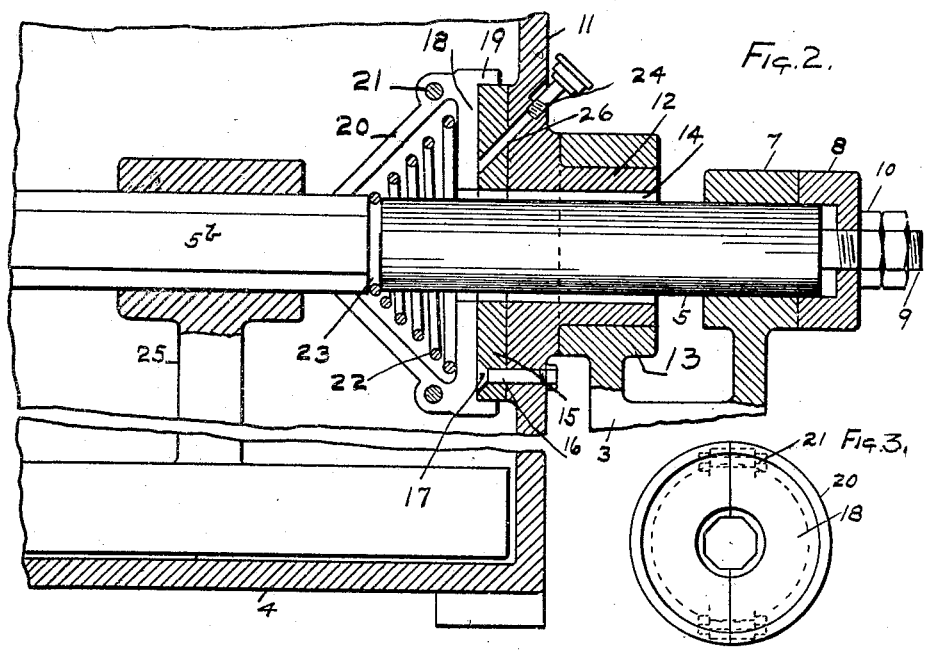
Inventor
Walter J. Pees
By
Attorney

UNITED STATES PATENT OFFICE.

WALTER J. PEES, OF MEADVILLE, PENNSYLVANIA, ASSIGNOR TO BLYSTONE MANUFACTURING COMPANY, OF CAMBRIDGE SPRINGS, PENNSYLVANIA, A CORPORATION OF PENNSYLVANIA.

MIXER.

1,337,468.    Specification of Letters Patent.    Patented Apr. 20, 1920.

Application filed March 15, 1917. Serial No. 155,085.

*To all whom it may concern:*

Be it known that I, WALTER J. PEES, a citizen of the United States, residing at Meadville, in the county of Crawford and State of Pennsylvania, have invented new and useful Improvements in Mixers, of which the following is a specification.

This invention relates to mixers and consists in certain improvements in the construction thereof as will be hereinafter fully described and pointed out in the claims.

Difficulty has been experienced in maintaining a tight joint between the rotating shaft and the end of the drum in mixers utilizing a horizontal drum. This has been particularly true in mixers used for mixing concrete and similar materials. The object of the present invention is to improve this joint between the drum and the shaft.

The invention is illustrated in the accompanying drawings as follows:—

Figure 1 shows a side elevation of a mixer.

Fig. 2 a central vertical section of one end of a mixer.

Fig. 3 an end view of one element of the joint.

1 marks the base of the machine, 2 and 3 upright posts for carrying the drum and mixing shaft, 4 the drum, 5 the shaft carrying the mixing blades, 6 and 7 bearings on the posts 2 and 3 respectively for the shaft 5. Caps 8 are arranged on the ends of the shaft 5 and studs 9 extend from the ends of the shaft 5 through the caps 8. Nuts 10 are arranged on the studs and by means of this structure the caps may be adjusted so as to receive the end thrust due to the action of the mixing blades.

The drum is provided with the ends 11 and the hollow trunnions 12 extend from the ends 11. These are journaled in the bearings 13 on the upper ends of the posts 2 and 3. The opening through the trunnion 12 is somewhat larger than the shaft leaving a space 14, the purpose of this space being to allow a free discharge of any material which may leak past the joint from the drum. The plate 15 having a joint surface is secured to the inside of the end 11 by means of screws 16, the screws having countersunk heads 17. A joint plate 18 operates against the surface on the plate 15 to form a joint to close the end of the drum around the shaft 5. This joint plate is made in halves and it preferably has a flange 19 surrounding the edge of the plate 15. A spring housing 20 extends rearwardly from the joint plate 18 and fits over the shaft 5, the shaft 5 being in this portion octagonal in shape so that the connection of the housing with the shaft locks the joint plate rotatively with the shaft. The halves of the joint plate are secured together by bolts 21. A conical spring 22 having its small end seated against a shoulder 23 on the shaft 5 exerts pressure against the joint plate and holds it in contact with the joint surface on the plate 15. In this manner there is a yielding pressure exerted on the joint plate 18 at all times thus assuring a closure between the surface on the joint plate and the plate 15 at all times. There is sufficient play between the housing 20 and the part 5ᵇ of the shaft to permit any slight movement of the joint plate that may be necessary to compensate for a lack of alinement of the surfaces. Any material that may leak into the housing 20 must go in such small quantities as to prevent a complete filling and solidifying in the housing. This is particularly true where the mixer is used for concrete because if the housing were completely filled with mixture it might set when the machine stopped and the device would be put out of action.

Mixing blades 25 are carried by the shaft 5 and a grease cup 24 is provided for forcing a lubricant to the joint an opening 26 being provided from the grease cup for this purpose.

What I claim as new is:—

1. The combination of a drum having a joint surface on the inside end thereof; a hollow trunnion extending from the drum; a shaft extending through the drum, the shaft being of a size leaving a space between the trunnion and shaft; a joint plate on the shaft seating on the joint surface on the drum; a spring pressing the joint plate and surface together; and a housing for the spring protecting the spring from the material within the drum, the space in the housing being in communication with the space between the shaft and trunnion.

2. The combination of a drum having a bearing surface on the inside end thereof; a shaft through the drum; a joint plate on the shaft seating on said surface; a spring on the shaft exerting pressure on the joint plate and pressing the joint plate against the bearing surface; and a housing extending from the joint plate over the spring.

3. The combination of a drum having a bearing surface on the inside end thereof; a shaft through the drum; a joint plate on the shaft seating on said surface; a spring on the shaft exerting pressure on the joint plate and pressing the joint plate against the bearing surface; and a housing extending from the joint plate over the spring, said housing engaging the shaft and locking the joint plate rotatively with the shaft.

4. The combination of a drum having a bearing surface on the inside end thereof; a shaft extending through the drum, there being an opening between the bearing surface and the shaft; a joint plate forming a bearing surface with the joint surface; a housing extending from the joint plate and engaging the shaft locking the joint plate rotatively with the shaft; a shoulder on the shaft within the housing; a spring resting on the shoulder and against the joint plate; a trunnion extending from the end of the drum; a bearing for the trunnion; and a bearing for the shaft outside of the trunnion.

5. The combination of a drum having a bearing surface on the inside end thereof; a hollow trunnion extending upwardly from the drum; a bearing in which the trunnion operates; a shaft extending through the trunnion and spaced therefrom; a bearing outside of the drum for the shaft; a joint plate on the shaft seating on the surface; a spring pressing the joint plate and surface together; and a housing protecting the spring from material within the drum, the space within the housing being in communication with the space between the shaft and trunnion.

In testimony whereof I have hereunto set my hand.

WALTER J. PEES.